United States Patent [19]

Mizuta

[11] Patent Number: 5,166,503
[45] Date of Patent: Nov. 24, 1992

[54] IC MEMORY CARD
[75] Inventor: Masaharu Mizuta, Itami, Japan
[73] Assignee: Mitsubishi Denki Kabushiki Kaisha, Tokyo, Japan
[21] Appl. No.: 584,714
[22] Filed: Sep. 19, 1990
[30] Foreign Application Priority Data
  Feb. 27, 1990 [JP] Japan .................................. 2-44427
[51] Int. Cl.$^5$ .............................................. G06G 5/00
[52] U.S. Cl. .................................. 235/492; 235/380; 235/381; 235/441
[58] Field of Search ................. 235/380, 381, 441, 492
[56] References Cited
U.S. PATENT DOCUMENTS
  4,256,955  3/1981  Giraud et al. ...................... 235/492
  4,797,543  1/1989  Watanabe ........................... 235/380
  5,025,420  6/1991  Kimura ........................... 365/230.01

Primary Examiner—Harold Pitts
Attorney, Agent, or Firm—Leydig, Voit & Mayer

[57] ABSTRACT

An IC memory card includes an IC memory chip, a connector for electrically connecting the IC memory chip to a terminal, a control circuit for maintaining the IC memory chip inoperative during a fixed period of time after the connector has been connected to the terminal, and a data generating circuit for outputting to the terminal specific data corresponding to a predetermined address during the fixed period of time for determining whether the connector is properly connected to the terminal.

7 Claims, 3 Drawing Sheets

IC MEMORY CARD

BACKGROUND OF THE INVENTION

1. Field of the Invention

The present invention relates to an IC memory card. More particularly, the present invention pertains to a memory card whose memory chip is accessed when the memory card is connected to a terminal machine through a connector.

2. Description of the Related Art

FIG. 5 is a block diagram of a conventional IC memory card. The IC memory card 1 has an input/output connector 2 which can be connected to a terminal (not shown), and an IC memory chip 3 which is connected to the connector 2 through an address bus 4, a control bus 5, and a data bus 6.

Generally, the control bus 5 comprises a chip enable signal line, an output enable signal line, a write enable signal line which must be activated to write data on or read data from the IC memory card 1. The address bus 4 consists of 15 signal lines $A_0$ to $A_{14}$ if the IC memory card 1 carries, for example, a single 256 Kbit IC memory chip 3. The data bus 6 contains 8 signal lines $D_0$ to $D_7$. In addition to the above-described signal lines, a power line, a grounding line, a card detect signal line, a write protect signal line and so on are present on the IC memory card 1. However, more than half of the pins of the connector 2 are used for the address bus 4 and the data bus 6.

In a case where the connector pin for the power line or the grounding line has a contact failure, the IC memory card 1 does not work at all. This anomaly can therefore be easily detected by the terminal machine to which the IC memory card 1 is connected. In a case where the connector pins for the control bus 5 have a contact failure, normal reading/writing of data to and from the IC memory card 1 is impossible, and the anomaly can thus be easily detected by the terminal machine, as in the above-described case. Furthermore, determination as to whether or not the data bus 6 is normal can be made by writing known data on the IC memory card 1 from the terminal machine, by reading it out and then by collating the data. The determination, however, requires the use of known data, such as $00_H$, $ff_H$, $55_H$ or $AA_H$.

However, it is impossible to find a contact failure which occurs on the connector pins for the address bus 4 because data, which is written on a false address area due to the contact failure, is read out from that false address area. Continuation of reading/writing of data in that state may damage the data stored in the IC memory chip 3.

For example, when data $55_H$ is to be written on address $111_H$, if address $101_H$ is accessed due to a contact failure of the connector pin for the signal line $A_4$ in the address bus 4, the data $55_H$ is written on address $101_H$. Thereafter, when the address $111_H$ is designated for inspection, the data $55_H$ stored on the address $101_H$ is read out. Thus, collation of the written data with the read data indicates that the address bus 4 is normal and it is thus impossible to find the contact failure of the connector pin.

In that case, when data is to be written on or read from address $101_H$ by the terminal machine, data is written on or read from the address 101H. So, the address where data is written or read when the address 101H is designated is the same as that where data is written or read when the address 111H is designated. This may damage the data stored in the IC memory chip 3.

Thus, the conventional IC memory card 1 has disadvantages in that the contact failure of the connector pins for the address bus 4 cannot be readily found, and in that the data stored in the IC card may be damaged.

SUMMARY OF THE INVENTION

The present invention is directed to eliminating the aforementioned problems of the prior IC memory card and has an object of providing a reliable IC memory card which enables the contact failure of the connector pins for the address bus to be readily found.

To this end, the present invention provides an IC memory card which comprises an IC memory chip, a connector for electrically connecting the IC memory chip to a terminal, a control circuit for maintaining the IC memory chip invalid over a fixed period of time after the connector has been connected to the terminal, and a data generating circuit for outputting to the terminal specific data corresponding to a predetermined address over the fixed period of time.

DESCRIPTION OF THE PREFERRED EMBODIMENTS

An embodiment of the present invention will now be described with reference to the accompanying drawings.

Figure 1:
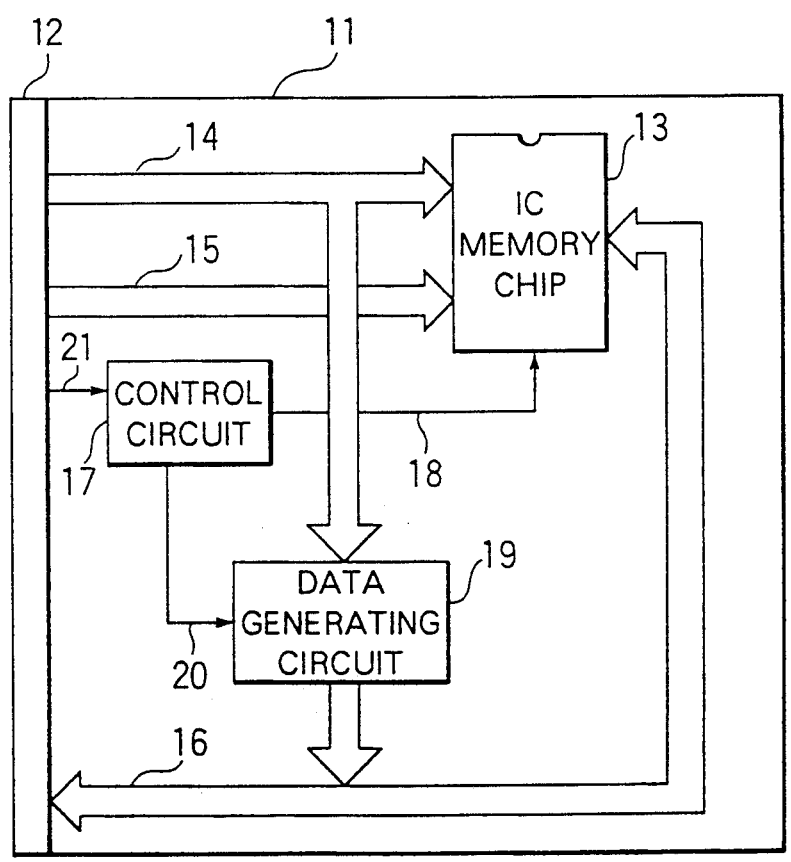
FIG. 1 is a block diagram of an embodiment of an IC memory card according to the present invention.

Referring first to FIG. 1, an IC memory card 11 has an input/output connector 12 which can be connected to a terminal (not shown), and an IC memory chip 13 for storing data, which is connected to the connector 12 through an address bus 14, a control bus 15 and a data bus 16. The connector 12 is also connected through a chip enable signal line 21 to a control circuit 17, which is in turn connected to the IC memory chip 13 through a signal line 18. A data generating circuit 19 is connected between the address bus 14 and the data bus 16. The control circuit 17 and the data generating circuit 19 are connected to each other through a signal line 20.

The control bus 15 consists of control lines other than the chip enable signal line 21, i.e., an output enable signal line, a write enable signal line and so on. The address bus 14 contains 15 signal lines $A_0$ to $A_{14}$. The data bus 16 contains 8 signal lines $D_0$ to $D_7$. In addition to the above-described signal lines, a power line, a grounding line, a card detect signal line, a write protect signal line and so on are connected to the connector 12, although not shown.

The control circuit 17 maintains the IC memory chip 13 inoperative and the data generating circuit 19 operative over a fixed period of time $\Delta T$ after the IC memory card 11 has been connected to the terminal through the connector 12 and the card detect signal has thereby taken on a significant condition. After the fixed period of time $\Delta T$ has elapsed, the control circuit 17 makes the IC memory chip 13 operative and the data generating circuit 19 inoperative. The data generating circuit 19 outputs to the data bus 16 specific data $55_H$ and $AA_H$ (in hexadecimal) when it is made operative by the control circuit 17 and when the minimum address and the maximum address are designated on the address bus 14.

Figure 2:
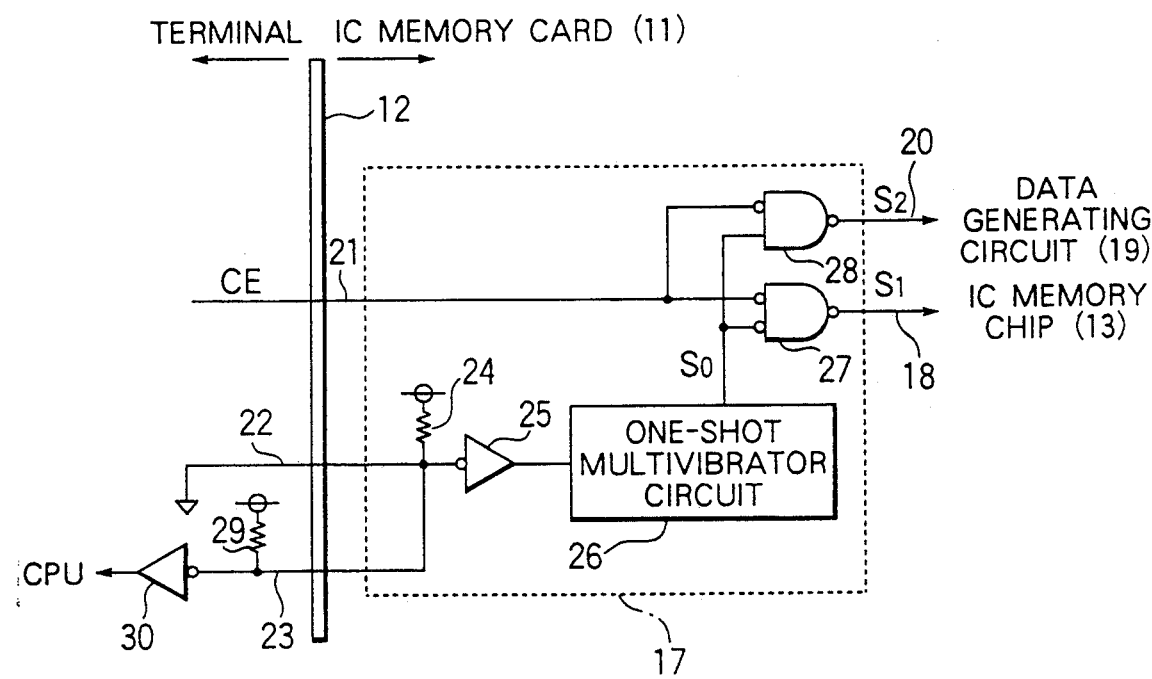
FIG. 2 is a circuit diagram showing the configuration of a control circuit and the vicinity thereof in a state in which the IC memory card of FIG. 1 is connected to a terminal.

FIG. 2 shows the configuration of the control circuit 17 and the vicinity thereof when the IC memory card 11 is connected to the terminal. First and second card detect signal lines 22 and 23 and the chip enable signal line 21 extend through the connector 12 between the IC memory card 11 and the terminal. Within the control circuit 17, the first and second card detect signal lines 22 and 23 are connected to a pull-up resistor 24 and to a one-shot multivibrator circuit 26 through an inverter circuit 25. Both the output of the one-shot multivibrator circuit 26 and the chip enable signal line 21 are respectively connected to first and second NAND circuits 27 and 28, which are in turn connected to the IC memory chip 13 and the data generating circuit 19 through the signal lines 18 and 20, respectively.

Within the terminal, the first card detect signal line 22 is grounded, and the second card detect signal line 23 is connected to a pull-up resistor 29 and to a CPU (not shown) of the terminal through an inverter circuit 30.

Figure 3:
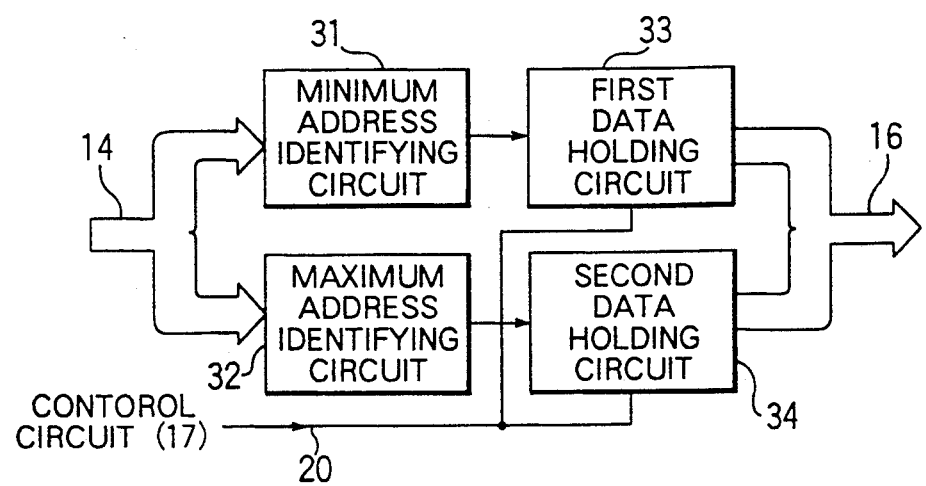
FIG. 3 is a circuit diagram showing the configuration of a data generating circuit.

FIG. 3 shows the configuration of the data generating circuit 19. The address bus 14 is connected to both a minimum address identifying circuit 31 and a maximum address identifying circuit 32 which generate an identifying signal when all the signal lines A0 to A14 of the address bus 14 are respectively at the logical low and high levels. The identifying circuits 31 and 32 are respectively connected to first and second data holding circuits 33 and 34 in which specific data $55_H$ and $AA_H$ are held beforehand. The data holding circuits 33 and 34 are connected to the control circuit 17 through the signal line 20 and to the data bus 16.

The operation of the embodiment will be described below with reference to FIG. 4 which shows the signal waveforms. When the IC memory card 11 is connected to the terminal through the connector 12, as shown in FIG. 2, the first and second card detect signal lines 22 and 23 are connected to the grounding line within the terminal and the voltage thereon, which has been pulled up to a power source voltage by the pull-up resistors 24 and 29, thereby drops to zero. This voltage drop is detected by the CPU (not shown) in the terminal through the inverter circuit 30. In response, the CPU outputs a chip enable signal CE such as that shown in FIG. 4 to the control circuit 17 in the IC memory card 11 through the chip enable signal line 21 at time $t_1$.

In the control circuit 17 of the IC memory card 11, the one-shot multivibrator circuit 26 is activated by the voltage drop on the card detect signal lines 22 and 23, and thereby outputs to the first and second NAND circuits 27 and 28 a control signal $S_0$ whose level remains high over a predetermined fixed period of time $\Delta T$. To the NAND circuits 27 and 28 is also input the above-described chip enable signal CE. In consequence, the first NAND circuit 27 outputs to the IC memory chip 13 a signal $S_1$ whose level remains high over the fixed period of time $\Delta T$ and the IC memory chip 13 is thereby maintained inoperative over the same period. The second NAND circuit 28 outputs to the data generating circuit 19 through the signal line 20 a signal $S_2$ whose level remains low over the fixed period of time $\Delta T$ and the first and second data holding circuits 33 and 34 in the data generating circuit 19 shown in FIG. 3 thereby become operative over the same period of time.

The CPU in the terminal determines the contacting state of the pins of the connector 12 in the manner described below after it outputs at the time $t_1$ the chip enable signal CE whose level is low. First, the CPU specifies the minimum address on the address bus 14 and reads out data. At that time, if the contact of the connector 12 is normal, the minimum address identifying circuit 31 in the data generating circuit 19 outputs an identifying signal, upon which the first data holding circuit 33 outputs data $55_H$ to the data bus 16, collation of the output data being then conducted by the CPU in the terminal. Subsequently, the CPU specifies the maximum address and reads out data from the maximum address in a similar manner. If the contact of the connector 12 is normal, the second data holding circuit 34 outputs data $AA_H$ to the data bus 16 on the basis of an identifying signal which is output from the maximum address identifying circuit 32, collation of the output data being then conducted by the CPU in the terminal.

When a contact failure exists in the connector 12, even though the terminal specifies the minimum address and the maximum address, a false address is input to the IC memory card 11 and no identifying signal is thus output from the minimum and maximum address identifying circuits 31 and 32. That is, data $55_H$ and $AA_H$ are not output to the data bus 16, and the contact failure in the connector 12 can thus be readily found by the CPU in the terminal.

While the above-described determination is being conducted, the IC memory chip 13 is required to be maintained inoperative by the signal $S_1$ from the NAND circuit 27 in the control circuit 17. The fixed period of time $\Delta T$ during which the IC memory chip 13 is maintained inoperative may be a few milliseconds. Such a fixed period of time $\Delta T$ prevents data from being output from the IC memory chip 13 during the determination, thereby preventing collision of data on the data bus 16.

Figure 4:
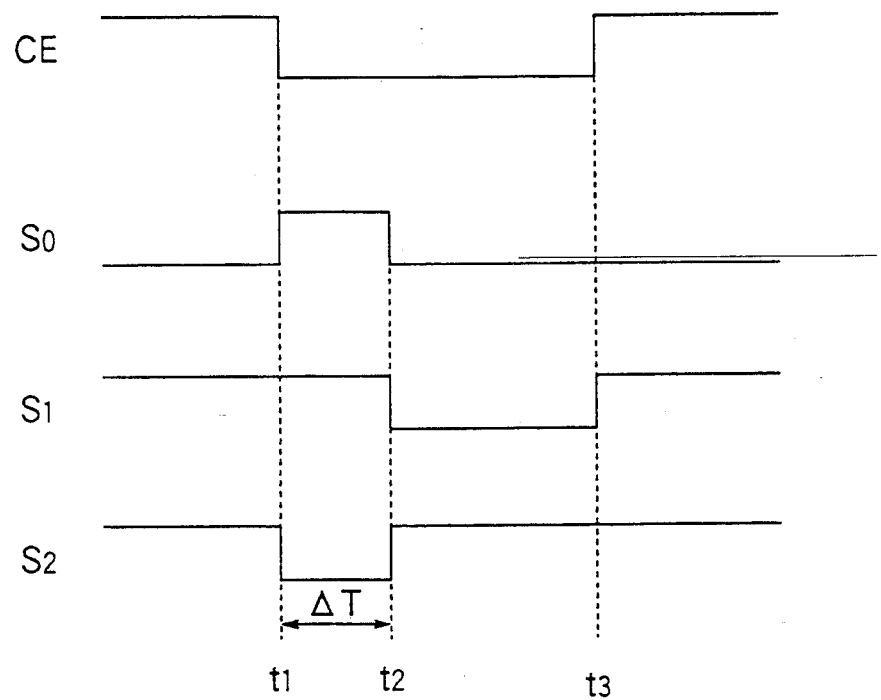
FIG. 4 illustrates the operation of the control circuit.
Figure 5:
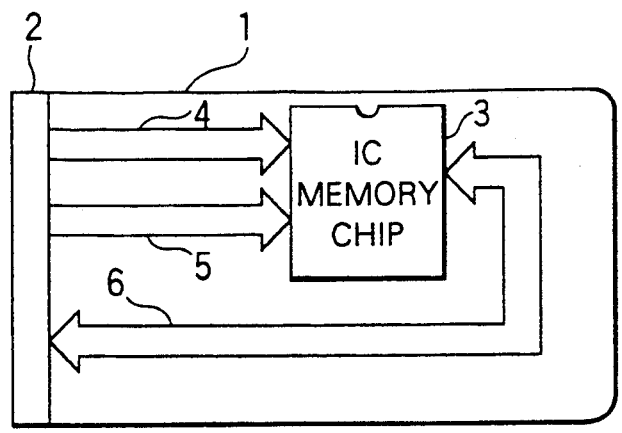
FIG. 5 is a block diagram of a conventional IC memory card.

In FIG. 4, after the fixed period of time $\Delta T$ has elapsed, the control signal $S_0$, which is output from the one-shot multivibrator circuit 26 in the control circuit 17, assumes the low level at time $t_2$, and the signals $S_1$ and $S_2$, which are respectively output from the first and second NAND circuits 27 and 28, thus assume the low level and the high level, respectively. As a result, the IC memory card 13 becomes operative, while the first and second data holding circuits 33 and 34 in the data generating circuit 19 become inoperative. Hence, in a case where it is determined that the contact of the connector 12 is normal by the inspection during the fixed period of time $\Delta T$, the IC memory chip 13 remains accessible so that the data can be written into and read from the IC memory card 11 until time $t_3$ at which the chip enable signal CE assumes the high level.

The data held in the first and second data holding circuits 33 and 34 in the data generating circuit 19 is not limited to $55_H$ and $AA_H$ but other data may also be used.

In the above embodiment, the specific data used for inspection is made to correspond to the minimum and maximum addresses. However, the contact failure of the connector pins may be discovered with a higher degree of accuracy if various combinations of addresses and data are used. In that case, the data may correspond to an area defined by the address which may be several tens of bytes higher than the minimum address and be several tens of bytes lower than the maximum address.

In the above embodiment, the one-shot multivibrator circuit 26 is driven when it is determined that the IC memory card 11 is connected to the terminal by the control circuit 17 due to a change in the electrical potential on the card detect signal lines 22 and 23. However, the one-shot multivibrator circuit 26 may be driven when the rise of the voltage of the power line (not shown) connected to the terminal through the connector 12 is detected. Alternatively, the one-shot multivibrator circuit 26 may be driven by means of a signal line for an exclusive use other than the first and second card detect signal lines 22 and 23 and the power line, which extends between the terminal and the control circuit 17 through the connector 12.

Since the present invention does not use for the inspection the area in the IC memory chip where data is generally written or read, it can be readily applied to the conventional IC memory card system by slightly altering the software thereof to construct a highly reliably IC memory card system.

What is claimed is:

1. An IC memory card comprising:
   an IC memory chip;
   a connector for electrically connecting said IC memory chip to a terminal;
   a control circuit for maintaining said IC memory chip inoperative during a fixed period of time after said connector has been connected to said terminal; and
   a data generating circuit for outputting to the terminal specific data corresponding to a predetermined address during said fixed period of time.

2. An IC memory card according to claim 1 wherein said card includes a card detect signal line for receiving a card detection signal form the terminal, a chip enable signal line for receiving an enable signal for enabling wiring of data into and reading data from said card, said control circuit including a multivibrator circuit connected to the card detect signal line, a first gate circuit connected between the chip enable signal line and said IC memory chip, a second gate circuit connected between said chip enable signal lien and said data generating circuit, said first and second gate circuits being connected to and controlled by said multivibrator circuit, the potential of said card detect signal line reversing when said connector is connected to the terminal, said multivibrator circuit maintaining said first gate circuit closed and said second gate circuit open during the fixed period of time after the potential on said card detect signal line has reversed, said multivibrator circuit opening said first gate circuit and closing said second gate circuit after the fixed period of time has elapsed.

3. An IC memory card according to claim 1 wherein said data generating circuit includes a first address identifying circuit for detecting designation of a first address, a second address identifying circuit for detecting designation of a second address, a first data holding circuit for outputting first data to the terminal when said first address identifying circuit detects designation of the first address, and a second data holding circuit for outputting second data to the terminal when said second address identifying circuit detects designation of the second address.

4. An IC memory card according to claim 3 wherein the first address is a minimum address and the second address is a maximum address.

5. An IC memory card comprising:
   an IC memory chip;
   a connector for electrically connecting the IC memory chip to a terminal;
   a control circuit coupled to the connector and responsive to the connector being connected to the terminal for maintaining the IC memory chip inoperative during a fixed period of time after the connector has been connected to the terminal; and
   a data generating circuit for outputting to the terminal specific data corresponding to a predetermined address during said fixed period of time.

6. An IC memory card according to claim 1 wherein the timing control circuit is responsive to a change in voltage on a card detect signal received from the connector.

7. An IC memory card according to claim 1 wherein the timing control circuit is responsive to a rise in voltage on a power line signal received from the connector.

* * * * *

UNITED STATES PATENT AND TRADEMARK OFFICE
CERTIFICATE OF CORRECTION

PATENT NO. : 5,166,503

DATED : November 24, 1992

INVENTOR(S) : Masaharu Mizuta

It is certified that error appears in the above-identified patent and that said Letters Patent is hereby corrected as shown below:

Claim 1, col. 5, line 31, change "said" to --the--.

Claim 2, col. 5, line 39, change "wiring" to --writing--;

Claim 2, col. 5, line 44, change "lien" to --line--.

Signed and Sealed this

Twelfth Day of October, 1993

Attest:

BRUCE LEHMAN

Attesting Officer     Commissioner of Patents and Trademarks